(12) United States Patent
Kalt et al.

(10) Patent No.: US 6,897,786 B1
(45) Date of Patent: May 24, 2005

(54) PASSIVELY ILLUMINATED, EYE-CATCHING DISPLAY FOR TRAFFIC SIGNS

(75) Inventors: Charles G. Kalt, Williamstown, MA (US); Mark S. Slater, North Adams, MA (US)

(73) Assignee: Display Science, Inc., North Adams, MA (US)

( * ) Notice: Subject to any disclaimer, the term of this patent is extended or adjusted under 35 U.S.C. 154(b) by 261 days.

(21) Appl. No.: 09/593,195

(22) Filed: Jun. 14, 2000

(51) Int. Cl.[7] .................................. G08B 5/00
(52) U.S. Cl. ..................... 340/815.4; 345/58
(58) Field of Search .................. 340/815.4, 905, 340/907, 933, 815.62; 345/31, 58, 85, 109; 359/540, 230

(56) References Cited

U.S. PATENT DOCUMENTS

| | | | |
|---|---|---|---|
| 3,154,872 A | * 11/1964 | Nordgren | 40/615 |
| 4,082,426 A | * 4/1978 | Brown | 359/540 |
| 4,564,836 A | 1/1986 | Vuilleumier et al. | |
| 5,231,559 A | 7/1993 | Kalt et al. | |
| 5,892,461 A | 4/1999 | Dokko | |
| 6,057,814 A | * 5/2000 | Kalt | 345/58 |
| 6,204,778 B1 | 3/2001 | Bergan et al. | |
| 6,317,108 B1 | 11/2001 | Kalt | |

* cited by examiner

*Primary Examiner*—John Tweel
(74) *Attorney, Agent, or Firm*—Kirkpatrick & Lockhart LLP; Anthony H. Handel (57) ABSTRACT

Low-cost, low energy, programmable and remotely activatable traffic signs, particularly suitable for roadside, waterside or comparable use, which signs can display a variety of messages or images, for example warnings and directions, employ electropolymeric shutter arrays in front of retroreflective materials (32). The signs employ daylight or other passive illumination external to the sign, such as vehicle headlights, to yield high contrast images with good visibility. Optional features include attention-getting effects such as flashing, economical solar power means and means to detect vehicle approach to initiate the attention-getting display, e.g. flashing.

16 Claims, 2 Drawing Sheets

PASSIVELY ILLUMINATED, EYE-CATCHING DISPLAY FOR TRAFFIC SIGNS

CROSS-REFERENCE TO RELATED APPLICATIONS

This application contains subject matter related to copending U.S. patent application Ser. No. 09/557,627 of Charles G. Kalt, filed Apr. 25, 2000 which is a continuation of U.S. patent application Ser. No. 09/055,575 filed Apr. 6, 1998 now U.S. Pat. No. 6,057,814 issued May 2, 2000. The disclosure of the aforementioned United States patent and patent application are hereby incorporated herein by reference thereto. The benefit of continuation status is not being claimed at this time with regard to the applications recited in this paragraph. This statement is made without prejudice to applicant's right to claim continuation status, with respect to another application, at any time during the pendency of the present application.

STATEMENT REGARDING FEDERALLY SPONSORED RESEARCH OR DEVELOPMENT (Not applicable.)

BACKGROUND OF THE INVENTION

1. Field of the Invention

The present invention relates to novel traffic signs for providing roadside alerts, information or directions and to display matrices which may constitute the visual area of a traffic sign. Preferred embodiments relate to programmable traffic signs which can display a variety of messages or images.

2. Description of Related Art Including Information Disclosed under 37 CFR 1.97 and 37 CFR 1.98

Motorists and other road users are greeted by a variety of signs embodying a diversity of technologies, as they travel a nation's highways and byways that are intended to inform, guide, direct and warn the motorist about ambient geography, conditions, events and facilities.

In the computerized information and entertainment age of the twenty-first century, roadside driver information technology has not kept up. New young drivers, steeped in the organized visual richness of the Internet, used to streaming video on demand and instant replay scoreboards at ball games, and possibly having a GPS-assisted navigation system at their fingertips in their vehicle, are confronted on the highways with what are, in the case of official, as opposed to commercial, display structures, a confusing array of iron age signs built with rust bowl technologies. Clear, eye-catching signs benefit road users and promote traffic safety.

Some sophisticated roadside driver information technologies are employed, but only for special purposes, and they still employ rather crude display technology. An example is an interactive height-alerting device such as one located on the Hutchinson River Parkway, approaching New York City, which uses radar to read the height of each oncoming vehicle and displays a backlit text message to overheight vehicles requiring them to exit the parkway, to avoid colliding with a low bridge. Such devices are expensive and power hungry and do not solve the problem of providing a visually enhanced display suitable for general purpose roadside signage.

Otherwise, the most technologically advanced type of traffic sign commonly encountered is probably the box-like, programmable, luminescent traffic advisory displays found on highways such as I-95, which provide short messages of perhaps twelve or fifteen letters and may cycle through two or three messages. Commonly mounted on overpasses or other raised fixed structures near the roadway, such traffic advisory displays employ a matrix array of small incandescent or reflective light sources, which are selectively illuminated to provide light patterns in the shapes of individual letters, which are read against a dark background, much like LED displays. Substantial candlepower is required for daylight visibility. They are used to provide a selection of messages to road users, most commonly relating to traffic conditions, e.g. "RUSH HOUR TRAFFIC EXITS 15–9"; "ACCIDENT EXITS 13–11"FOG: REDUCE SPEED". Displays of this type have poor resolution limited by the size of the light source required for adequate daylight visibility, are bulky and expensive to install and maintain, and require a significant power supply.

Other signs used for navigation and traffic management are nearly all passive, reflective signs, relying upon daylight or vehicle headlights for visibility. Examples are the green, or in some countries blue or yellow, background billboard-like signs used to indicate towns, cities and intersecting routes. Many of these signs employ coating materials with enhanced reflectivity, as may marker badges for named and numbered interstates, parkways, turnpikes and other trunk roads, and also some stop signs and the like. Particularly effective at night are retroreflective coatings which have significant capacity to reflect received light back to the source in a direction parallel to the incident path, giving motorists good visibility by the light from their own headlights, and perhaps occasional glare when sunlight catches the sign at just the right angle. Retroreflectivity can be provided by incorporating glass beads in the paint or other coating used to provide the sign's reflective surface, see for example U.S. Pat. No. 5,514,441 (Pohto et al.), U.S. Pat. No. 6,054,208 (Rega et al.) and U.S. Pat. No. D413,731 (Hannington), assigned to Avery Dennison Corporation; U.S. Pat. No. 3,700,305 (Bingham) and other related patents assigned to Minnesota Mining and Manufacturing Company; U.S. Pat. No. 5,936,770 (Nestegard) and other related patents assigned to 3M Innovative Properties Company.

Other signs such as state route markers, lane markers and the like, employ old fashioned black paint on a white background providing an inferior visual effect. Such signs are easily overlooked under conditions of poor visibility, or when the field of view is congested with traffic, or with other official or commercial signs, or is simply badly located.

By way of example of the drawbacks of existing sign technology, countless accidents, some of them fatal, are caused every year by the failure of motorists to observe one of the familiar octagonal red stop signs that are ubiquitous on American roads. It would be desirable to have an active sign technology which could catch the attention of unobservant drivers.

While a greater variety of commercial outdoor advertizing and promotional display devices is available, laced with eye-catching characteristics such as videotext, neon, and sometimes full-color video, none known to applicant offers a satisfactory combination of characteristics to provide an enhanced roadside visual communication technology suitable for widespread deployment. Known visually striking commercial display technologies are usually high maintenance, high cost, and insufficiently rugged and durable to be widely adopted for general purpose roadside signage.

There is accordingly a need for a display technology which can provide low-cost, low-maintenance traffic signs with enhanced visibility and eye-catching characteristics. There is a further need for such technology to be programmable to display a variety of messages or images.

BRIEF SUMMARY OF THE INVENTION

The present invention solves the problem of providing a display matrix suitable for use in traffic signs that is programmable to display different images and is visible both day and night, yet requires little power. To solve this problem, the invention provides a pixellated video display matrix comprising:

a) a retroreflective layer; and
b) an electropolymeric gating layer to gate incident light, the gating layer having an array of contiguous electrostatically driven polymeric shutter elements defining the display pixel, the shutter elements being movable between open and closed positions;

wherein an open shutter permits incident light to be reflected from the retroreflective layer providing an open shutter appearance and a closed shutter presents a contrasting appearance to the viewer.

The retroreflective layer can comprise light-reflective elements, or other light-modulating structure, capable of reflecting light received in a non-perpendicular direction of incidence back in the direction of incidence, or parallel, or nearly parallel thereto, for example, transparent microspheres or glass beads, or prismatic sheeting. Such a display matrix, when disposed adjacent a roadway to receive light from a road vehicle's headlights, for example in a traffic information sign, is capable of reflecting light from the road vehicle's headlights back toward the viewer, creating a strikingly visible image at night. Using suitably reflective and contrasting materials such a sign is also clearly visible by daylight.

Preferably, the gating layer comprises:
i) a number of prestressed coiled rectangular rollouts formed of outwardly metallized flexible polymeric material;
ii) a transparent dielectric layer having a viewer-facing surface contacted by the metallization of each rollout; and
iii) a transparent electrode layer contacting the opposite surface of the dielectric layer;

and wherein one or more rollouts can be actuated to unroll across the dielectric layer and present a closed shutter appearance by application of a control voltage between the electrode layer and the rollout metallization.

The rollouts can be contiguously disposed in an orthogonal array and wherein the rollouts are selectively operable whereby a desired pattern of rollouts can be opened to display a desired image of the retroreflective layer, other rollouts in the layer remaining closed to provide a contrasting background. Such a display matrix can readily be computerized and programmable to selectively display desired images.

A particular advantage of the invention is the ability to provide a low cost display capable of generating a flashing text or iconic image, or other desired informative image, which is particularly attention-getting when flashed, for example at a frequency of about once per second. Preferred light-reflective elements comprise transparent microspheres or prismatic elements. The display matrix can be incorporated in a traffic sign and constitute the visual area of the sign, or a variable image element in the visual area.

BRIEF DESCRIPTION OF THE SEVERAL VIEWS OF THE DRAWING

One or more embodiments of the invention and of making and using the invention, as well as the best mode contemplated of carrying out the invention, are described in detail below, by way of example, with reference to the accompanying drawings, in which.

DETAILED DESCRIPTION OF THE INVENTION

Figure 1:
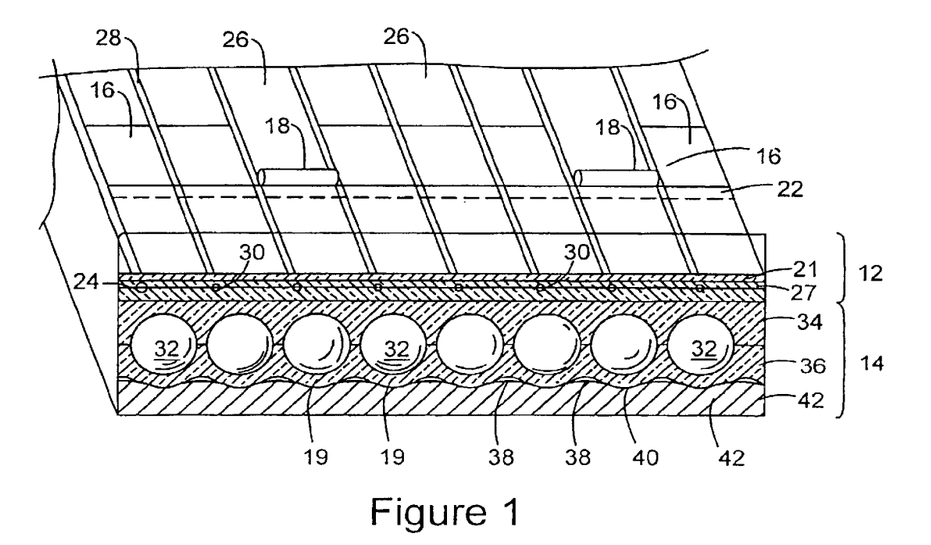
FIG. 1 is a schematic perspective view, partly in section, of a portion of a display matrix for an attention-getting traffic sign according to the invention.
Figure 2:
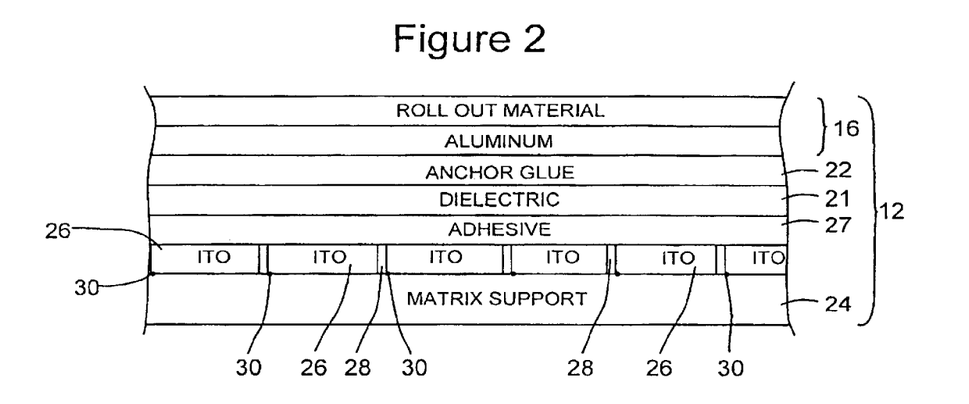
FIG. 2 is a schematic cross-sectional view of a portion of the display matrix shown in FIG. 1.
Figure 3:
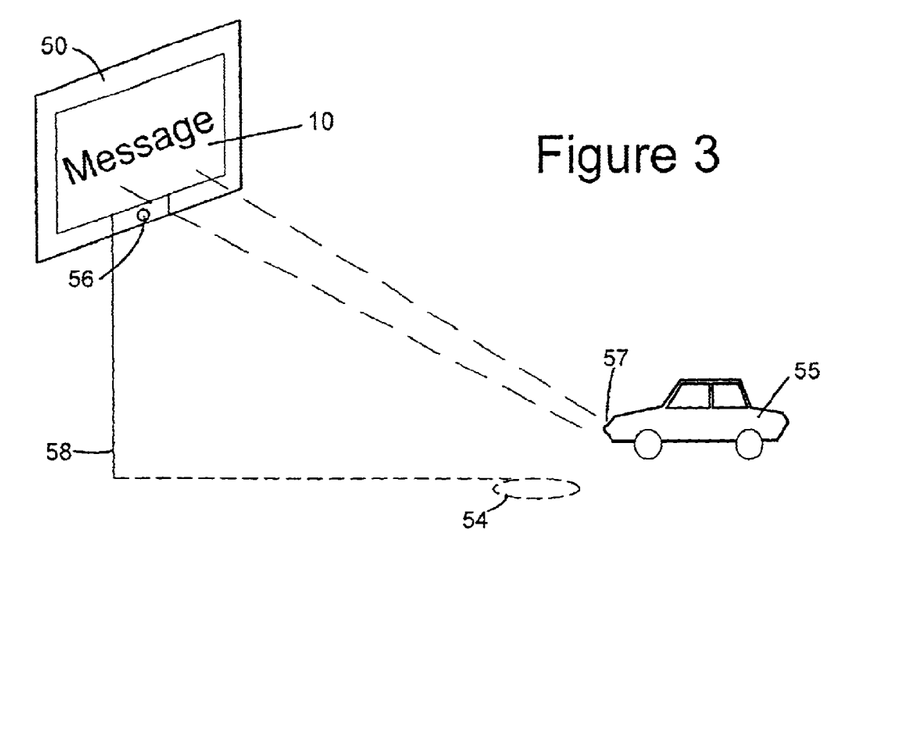
FIG. 3 is a schematic view of an informational traffic sign having a display matrix as illustrated in FIG. 1, in use at a roadside.

Referring to FIGS. 1 and 2, display matrix 10, of which only a portion is shown, is to be understood to be the active component of a passively illuminated, programmable traffic sign, the remaining structure of which are such as described and illustrated in the related application or otherwise known to those skilled in the art. Display matrix 10 is shown, for convenience, in FIG. 1, as extending generally horizontally across the paper with the intended viewer being located above the display and the direction of viewing being down the paper. In practice, display matrix 10 will usually be approximately vertically oriented. Display matrix 10 can be formed as flexible or rigid sheets or sheeting, in continuous or piece form, and may be fabricated to size or in bulk stock for subdividing into desired pieces.

The novel structure of display matrix 10 provides a traffic sign capable of displaying a striking, attention-getting visual effect. Display matrix 10 has two functional sections, considered vertically, namely a pixellated electropolymeric light gating section 12 divided into pixels and a retroreflective layer 14, each of which layers has a number of component parts, as will be apparent from the description hereinafter.

Light gating section 12 comprises an addressable shutter matrix provided by an orthogonal array of electrostatically controlled pixels, each of which is defined by a polymeric rollout 16, two of which rollouts, referenced 18, are shown in retracted mode. Rollouts 16 are arranged in what may arbitrarily be called rows extending from left to right across FIG. 1, while the lines of rollouts 16 extending in the direction of rolling and unrolling may be termed columns.

Each rollout 16 comprises a rectangle of metallized polymer film which can be coiled into a spiral. The metallized polymer film can, for example, be a 1 to 2 micron thick sheet of polyethylene naphthalate (also referenced "PEN" herein), or polyethylene terephthalate, or other suitable flexible material having a conductive surface, which sheet is coated on its lower surface (as viewed in FIG. 1) with a thin layer of aluminum or other flexible conductive material. Rollouts 16, when extended are contiguous one with another and fill the display area. Preferably, rollouts 16 are cut from a common sheet or continuous film of material. Each rollout is prestressed to adopt, when relaxed, a coiled, retracted configuration, as indicated for rollouts 18, in which configuration the shutter or light gating constituted by the rollout is "open" to the passage of light. The metallization on each rollout 16 provides an electrode which can be utilized to apply a voltage to the rollout to cause it to unroll.

Application of suitable electrostatic force, as described hereinbelow, uncoils a signal selected rollout 16 to a flat, rectangular configuration, gate or shutter closed. If desired, the upper surface of each rollout 16, which is displayed to the viewer when the shutter or gate constituted by the rollout is "closed" to the passage of light. Rollouts 16 are generally opaque, and the opacity may be provided by the metallization, by the polymer or by pigmentation, for example a coating of printing ink, on the upper surface of the rollout, which pigmentation may be green, black, blue or any other desired color providing suitable contrast. As will be further described hereinbelow, the rollout coating may also be retroreflective, if desired.

Rollouts 16 are supported on a transparent dielectric layer 21, which may be any suitable polymeric or other material, for example polypropylene, with a suitable thickness, for example 8 μm (0.315 mil). Rollouts 16 are secured to dielectric layer 21 by adhesive anchor lines 22 which extend across display matrix 10 from one side to the other.

A transparent matrix support layer 24 is coated with a layer of fixed column electrodes 26 comprising contiguous parallel strips of a transparent conductive material for example indium tin oxide ("ITO" hereinafter) or other suitable transparent conductive material. Column electrodes 26 extend transversely of, and orthogonally to, adhesive lines 22 (for convenience the transverse sections of conductors 26 are not shown in FIG. 1), providing a half-select system for addressing the pixels, as will also be further described hereinbelow. Column electrodes 26 are separated, each from its neighbor, by air gaps 28 or equivalent insulators. Column electrodes 26 can be fabricated by coating support layer 24, with ITO for example to a resistivity of about 100 ohm/square, and etching air gaps 28 in the ITO coating.

Dielectric layer 21 can be closely engaged with column electrodes 26, over the full extent thereof, preferably without air gaps so that, with its rollout 16 extended, each pixel comprises a capacitor defined between the metallized under surface of rollout 16 and a portion of a corresponding column electrode 26 across dielectric layer 21 which is sandwiched therebetween.

However, mere close engagement of dielectric layer 21 with column electrodes 26 may result in electrical field discontinuities, and provide inadequate or inconsistent capacitative characteristics leading to poor performance of display matrix 10. Accordingly it is preferred to provide for more intimate electric field continuity between dielectric layer 21 and column electrodes 26 which can be obtained for example, by employing a thermoplastic polymer for dielectric layer 21 and heat-sealing dielectric layer 21 to the layer of column electrodes 26. While potentially providing more intimate contact such a method has the drawback of complicating the manufacturing process and adding expense.

A preferred, low-temperature solution to the problem of providing intimate contact between transparent conductors 26, when formed of a relatively hard and brittle ceramic-like or refractory metal oxide material such as indium tin oxide, and a polymeric dielectric is to provide an interface comprising an occlusive layer 27 of a nonpolar, nonconductive adhesive between the two structures. Occlusive layer 27 fills any discontinuities that may occur in conductors 26, displacing any air voids and providing continuity between the two layers. Occlusive layer 27 may form a compound dielectric with dielectric layer 21. The nonconducting, insulative properties of preferred nonpolar adhesives help maintain the electrical separation of conductors 26.

A particularly preferred nonpolar adhesive for occlusive layer 27 is a general purpose polyester-based laminating adhesive supplied by Ashland Chemical Corporation under product code Ashland PLIOBOND (trademark) 4081. Other non-polar, polyester-based laminating adhesives, used for example for bonding packaging films and foils, that can be used in the practice of the invention, will be apparent to those skilled in the art.

Another nonpolar adhesive which may be useful in the practice of the invention, can be obtained by admixing a suitable proportion of an aliphatically compatible tackifier such as a hydrogenated dicyclopentadiene("DCPD")/napthalenic alkylation resin with a polyolefin resin, for example, Rexene Corporation's REXTAC 2730 polyolefin. Such an adhesive is described in Biswas et al. U.S. Pat. No. 5,391,670, assigned to Hercules Incorporated, see Example 27 and Table 11.

It will be understood that applications of the inventive solution to the problem of providing electric field continuity between transparent conductors 26 and dielectric layer 21, by employing non-polar adhesive interface layer 27, are not limited to display matrix 10, but extend to other display structures and to other structures where the benefits of electric field continuity are desirable.

Matrix support layer 24 can be of any suitable material, for example, plastic or glass, which will provide structural support and is suitable for incorporation in a road sign. A preferred such plastic is a synthetic polymer, for example, polyethylene terephthalate.

Optionally, linear wire conductors 30 can be embedded in support layer 24 to assist the distribution of current along column electrodes 26. Conductors 30, if employed, are embedded at the upper surface of support layer 24 with an exposed surface directly contacting the column electrodes 26 and with one conductor 30 extending along each column electrode 26, in parallel with the electrode, although more such conductors 30 could be employed, if desired.

Rollouts 16 can be actuated to roll out and cover their pixel area displaying their optionally pigmented upper surface to a viewer, by applying a suitable ac or dc voltage between column electrodes 26 and adhesive lines 22. Suitable drivers and drive circuitry, power supplies and the like for generating and applying a video control signal are known in the art, for example from U.S. Pat. No. 6,057,814 to first inventor Kalt herein. In response to an applied voltage, capacitative attraction causes a selected rollout 16 to unroll across dielectric layer 21. When the voltage is removed, and the charge decays below threshold, the coiling stresses induced in the rollout during manufacture restore it to its coiled configuration. Each individual rollout 16 can thus function as an efficient fast-acting shutter. Very little energy is required to operate the shutter. The half select conductor system provided by adhesive lines 22 and column electrodes 26 enables rollouts 16 to be individually addressed, whereby any desired combination of rollouts 16 can be opened on a given cycle of the video signal.

The foregoing elements 16–30 constitute light gating section 12 which controls the admission of light to reflecting section 14.

Reflecting section 14 supports light gating section 12 and comprises a monolayer of transparent microsphere lenses 32, typically glass beads or microspheres, embedded in a binder layer 34 of transparent binder material. A spacing layer 36 is coated over the back surfaces of the microsphere lenses 32 and contoured so as to follow the curved surface of the back of the microspheres, the structure being inverted from the position shown in FIG. 1 during manufacture. An image layer 38 is coated onto spacing layer 36. A specularly reflective layer 40 is coated over spacing layer 36 and image layer 38. Beneath reflective layer 40 is a protective back layer 42, such as a layer of adhesive or other polymeric material. Back layer 42 protects reflective layer 40, provides a means for attachment of the display matrix sheeting to a substrate, and provides further strength to the sheet material.

The construction and manufacturing details of reflecting section 14, per se, are generally well known to the art, for example from Brown U.S. Pat. No. 4,082,426 and Nordgren U.S. Pat. No. 3,154,872. It is to be understood that FIG. 1 is simplified, or idealized, in that microsphere lenses 32 are shown to be all of the same size, and evenly spaced in a perfect monolayer. In fact, the manufacturing process is usually such that the size of the microsphere lenses statistically varies within a range, and the microspheres are not arranged in a perfect monolayer at a uniform spacing.

Incident light from a source received by reflecting section 14 travels through binder layer 34 and microsphere lenses 32 and is reflected back through microsphere lenses 32 by specularly reflective layer 40. The reflected rays travel back toward the source in a direction approximately opposite to, or approximately parallel to the direction of the incoming incident rays. Typically, microsphere lenses 32 comprise glass beads. Specularly reflective layer 40 may comprise alternative retroreflective structures to microsphere lenses 32, for example clear prisms, or other structures capable of redirecting divergent reflected light rays toward the incident path so as to enhance the brightness of the reflected image.

Light gating layer 12 controls the admission of light to reflecting layer 14. Light received from a source through a pattern of open rollouts 16 in gating layer 12 is transmitted to reflecting layer 14, whence the light is returned through the open rollouts 16 in gating layer 12 to the source, providing an image corresponding with the pattern of open rollouts to a viewer, or perhaps a camera or the like, at the source. The retroreflective properties of reflecting layer 14 return the light with dramatically reduced divergence as compared with reflection from a plane white, or mirrored, surface, providing an image of dramatically superior intensity and viewability. The displayed image is essentially so-called monochrome, comprising a bright image, which can be colored, if desired, and is presented against a dark background provided by the extended rollouts. In most cases, rollouts 16 will all have the same appearance and reflective layer 14 will be homogenous in appearance across its area. However, if desired, for particular effects, rollouts 16 may have different appearances, one from the other, provided for example by diverse pigment coatings on the rollouts, as described above; while some areas of the reflecting area may be colored, e.g. orange to indicate a hazard, while others areas are white or another color.

The displayed image can take essentially any desired form within the physical constraints of display matrix 10, including its resolution, as determined by the video drive signal. The image may be a static text image, e.g. "SLOW DOWN: FOG AHEAD", or simply "NORTH ANDOVER"; a cycling of a series of text images constituting a message, e.g. "WEIGH STATION OPEN" and "ALL TRUCKS MUST EXIT"; a graphic display e.g. an intersection map; or a moving video display providing a more sophisticated communication. The programmability and addressability of gating layer 12 provides a wide range of display options, as will be apparent to those skilled in the art.

A particularly valuable option, enabled by a suitable display program algorithm stored in storage media at the sign, and which constitutes a preferred embodiment of the invention is the ability to provide a flashing message by cycling rollouts 16 open at a suitable frequency, for example once per second. Other effective flashing intervals will be apparent to those skilled in the art, and may for example range from about 0.2 to 5 seconds, preferably from about 0.5 to 2 seconds.

Such a flashing sign is particularly eye-catching and attention getting and effective in ensuring that motorists are alerted to emergencies or dangerous situations such as accidents or high winds on bridges. Such a flashing message may also be especially helpful in light fog or other circumstances of reduced visibility. Not all the message need be flashed: for example, only the word "ACCIDENT" might be flashed in the message "CAUTION! ACCIDENT 1 MILE AHEAD".

Alternative, attention getting images may comprise a text or other image which scrolls or crawls across display matrix 10 or which changes cyclically.

Because the electropolymeric shutters constituted by rollouts 16 require very little power, and no power-hungry emissive light source is employed, display matrix 10 can be solar powered employing a solar cell or solar panel comprising an array of photovoltaic cells, if utility power is not readily available. If desired, a long life rechargeable battery, e.g. a nickel-cadmium battery can be provided to power display matrix 10 when solar radiation is unavailable or inadequate, for example, at night. Data processing, data storage and optional communications capabilities, for remote programming, are provided as needed.

The low power demands of display matrix 10 mean that the solar power means and battery support, if employed, required to power display matrix 10 need be of only modest capacity so that display matrix 10 can be self-powered at relatively low cost. Self-powered embodiments of the invention are eminently suitable for rural and remote locations where utility power is unavailable or undesired. A further option for use in such locations is to provide low bandwidth radio-modem communications capabilities for remote programming.

Further embodiments can include ambient condition sensors or weather sensors and control circuitry programmed to display a message relevant to the sensed ambient or weather condition. For example, activation of a moisture sensor could trigger the display of the message "CAUTION! SLICK SURFACE"; activation of a visibility sensor would warn of fog, and so on. Such sensors might be located in the immediate vicinity of the sign or may be located more or less remotely from the sign and communicate with same via conductor wire, radio transmission or equivalent. For example a sensor or sensors for detecting snow, e.g. a combination of temperature and precipitation sensors might be located on a mountain road, and communicate with a warning sign located on an approach road, the warning sign being programmed to display a message such as "SNOW 5 MILES AHEAD" when triggered by the snow sensor.

Display matrix 10 is particularly suitable for use as the display component of traffic signs and other informational displays where good visibility by both day and night is required and where the provision of an emissive energy-consuming light source to illuminate the sign at night would entail undesired initial or running costs, or would be impracticable. Referring to FIG. 2, there is illustrated one possible mode of deployment of a retroreflective traffic sign 50 according to the invention, which sign incorporates one, or possibly more, modules of display matrix 10, along with appropriate drive circuitry, memory, processors and the like. If multiple modules of display matrix 10 are employed, they are preferably coordinated by means of suitable control circuitry. As is customary, traffic sign 50 is deployed at a roadside where it is supported on a pillar, bridge or the like (not shown). Traffic sign 50 has an active signage area which may extend substantially over the whole front face of the sign and is constituted by display matrix 10.

One or more vehicle sensing devices can be associated with, or coupled to the sign, to trigger a flashing, scrolling or crawling display mode or other conspicuous and eye-catching visual effect, especially at night. The vehicle sensing device is coupled with the drive circuitry for display matrix 10, for example, by being electrically connected therewith.

One preferred embodiment of vehicle sensing device comprises one or more inductive, or equivalent, proximity switches 54 located beneath the surface of the roadway, at a suitable point or points ahead of traffic sign 50, to detect the presence of a vehicle passing over proximity switch 54.

Alternatively, the vehicle sensing device can, for example, be a cadmium sulfide, or other photocell 56 mounted at or near the display to sense the headlights of an approaching vehicle at night. Optionally a second photocell (not shown) can be provided to sense ambient light cells and activate photocell 56 to function only at low ambient light levels. A photovoltaic array can be provided to power traffic sign 54 in daylight, if desired, along with a storage battery, charged by the photovoltaic array, to power traffic sign 54 when solar radiation is inadequate.

It will be apparent to those skilled in the art that many alternative means can be employed, for triggering the drive circuit to actuate traffic sign 50, or to trigger a selected eye-catching display, in response to proximity or approach of a vehicle.

With this arrangement, when an automobile, truck or other road vehicle approaches traffic sign 50, the vehicle's headlights focused into a beam in front of the vehicle excite photocell 56, or the electromagnetic radiation from the vehicle's spark plugs acts on proximity switch 54, and trigger the drive circuitry which controls traffic sign 50. The drive circuitry opens selected rollouts 16 in a static or dynamic pattern, defining a desired attention-getting image according to the display program or external inputs thereto.

Light from the vehicle's headlights passes through the opened rollouts and through the transparent layers of the display to microsphere lenses 32 which reflect the light back toward the vehicle, creating a strikingly bright image. In flashing mode, display matrix 10 oscillates from ON to OFF causing the driver's eye to focus on the moving indicia. Whether by day or night, traffic sign 54 will cause the viewer to notice it with keen interest, potentially providing a road safety margin which may be instrumental in saving lives.

The combination of a programmable electropolymeric shutter array, to define an image with a retroreflective backing to illuminate the image, provides an unusually eye-catching sign.

A low cost, modified embodiment (not shown) of traffic sign 54, is dedicated to a single message and is particularly suitable for use in remote locations or other locations where a power supply is unavailable or undesired and costs must be minimized. In this modified embodiment, the image, for example "SHARP CURVE" is formed of retroreflective material, for example glass beads, or other microspheres, the surrounding portions of reflective layer 12 being dark. In this case only the image is reflective. Gate layer 12 need extend only over the image area. Rather than being addressable to define an image, rollouts 16 in gate layer 12 operate in unison, to reveal the image when open, avoiding the costs associated with addressability. Gate layer 12 can be powered by photovoltaic cells and a battery to oscillate, and effectively flash the sign when power is available, and fail open, revealing the static image, for an effective, albeit less striking display in the absence of power. In the event the battery has inadequate charge to flash through the night, owing to inclement weather, or inadequate day length, power may nevertheless be available to flash the sign during and immediately after dusk, for peak traffic, becoming unavailable perhaps only in the early morning hours of light traffic.

An optional feature of the invention is the presence of image layer 38 in reflecting layer 14. Image layer 38 provides markings visible only at a predetermined angle different from the normal angle of viewing, as is per se taught by Brown. Such marking could embody a code indicating the location, owner, identification or other information about the sign.

Another optional feature is for the reflective zone 14 to include a focusing layer between microsphere lenses 32 and reflecting layer 40 to provide a decorative visual effect, for example a rainbow effect, such for example, as taught by Mori U.S. Pat. No. 5,962,121. The decorative effect may be useful in its own right in the case of stickers emblems medallions or the like, or may be useful to distinguish a particular portion of the display, for example, in the case of a directional traffic sign comprising the name of a city, town or village or the like, and an arrow corresponding with the topography of an exit ramp, the pixels in the area of the arrow may be enhanced with the decorative visual effect.

Also, if desired, the corrosion resistance and white light reflectivity of reflecting section 14 can be enhanced by including dielectric mirrors adjacent microsphere lenses 32, for example, as taught by Bingham U.S. Pat. No. 3,700,305. Other optional embodiments of the invention include; provision of differential retroreflectivity such as taught by Sevelin U.S. Pat. No. 3,801,183 which may be used to emphasize different parts of the sign; provision of a covering layer over microsphere lenses 32, for example binder layer 34 which is contoured to follow the outer surfaces of microsphere lenses 32, to enhance the effective viewing angle of display matrix 190, such as taught by Morikawa U.S. Pat. No. 4,293,189; employment of a preformed spacing film to enhance the angularity of the display, such for example, as taught by Bailey U.S. Pat. Nos. 4,505,967 and 4,648,932; inclusion of light-emitting beads to provide a luminous effect such, for example, as taught by Abe U.S. Pat. No. 5,988,822; and mutually compatible combinations of any of the foregoing features. Energy for luminosity can be voltaic provided by a battery, power line, photovoltaic cell or the like or ultraviolet radiation, for example sunlight captured by employing uv-retentive bead material. While such material may have a significantly short decay time, the most valuable period for luminosity will usually be right after dusk, while the material is still active.

Other optical elements providing enhanced directional reflectivity toward the source of illumination, or to road users, can be employed in place of microsphere lenses 32, for example, prisms such, as taught by Araki U.S. Pat. No. 6,012,818, or cube corner elements such as taught by Nestegard et al. U.S. Pat. No. 5,936,770, U.S. Pat. Nos. 4,805,984; 4,906,070; 5,056,892; 5,175,030; and 5,183,597; and Japanese Unexamined Patent Publication Number 60-100,103.

Still further retroreflective optical elements that may be employed in display matrix 10 are described in U.S. Pat.

Nos. 5,514,441, D413,731 and 6,054,208. If desired, the retroreflective elements may be colored, for example as taught in U.S. Pat. No. 6,054,208. Optionally, display matrix may include both colored and white areas, for example, in bands, and the same (or possibly different messages) can be flashed first in one color and then in another, for greater attention getting effect, or for other reasons.

Generally, rollouts 16 can be disposed in any convenient orientation, without significantly affecting their performance. However, if desired, for outdoor traffic signs or other displays, advantage may be taken of the silver or metallic appearance which a retracted or coiled rollout exhibits as a result of metallization of its undersurface, by disposing the rollouts to extend and retract vertically, preferably to extend upwardly and to retract downwardly. The retracted rollout 18 will reflect overhead light from the sky, or sun, and some of the reflected light will travel toward adjacent microsphere lens or lenses 32 in the pixel above and/or below the retracted rollout 18, in a direction or directions such as to be reflected toward the adjacent roadway, enhancing the appearance of that pixel at some point in the travel of a passing motorist.

The inventive traffic sign is particularly suited for communicating with automobile traffic on or using highways or other roads, by means of a textual display, but the invention is in not limited to such applications and may be effectively employed for alerting and notifying other vehicle users, for example on waterways, using airports, and so on.

Another embodiment of the invention provides a low-cost fixed image flashing sign, optionally self-powered, as described hereinabove. In this embodiment the message, icon, graphic or other image is permanently embedded in the sign by employing a message image pattern of retroreflective elements surrounded by a contrasting background. Rollouts 16 in gate layer 12 are operated in unison at a desired frequency to flash the sign. The result is a very low cost, low power, yet highly visible, flashing sign which, not being programmable, can avoid the expense and power requirements of addressability and communications. In the absence of power rollouts 16 will retract open, displaying a static image which will lack the eye-catching quality of the flashing mode, but will still be clearly visible.

Each and every one of the patents and patent applications referenced herein is hereby incorporated herein by reference thereto.

Figure 4:
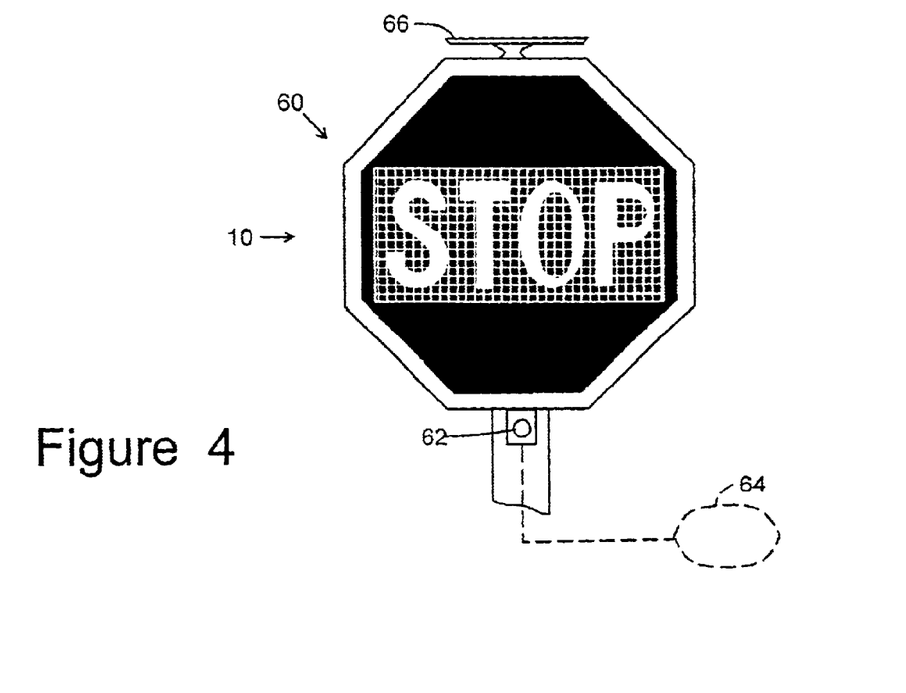
FIG. 4 is a schematic view similar to FIG. 3 of a novel "STOP" sign according to the invention.

The novel stop sign 60 illustrated in FIG. 4 can be similar to traffic sign 50 and employs an embodiment of display matrix 10 which optionally extends only over the lettered area. The letters for "STOP" are rendered in retroreflective material, and preferably rollouts 16 have upper surfaces with a traditional red color. In practice, the preferred pixel size, as defined by rollouts 16, will be relatively substantially smaller than is suggested by FIG. 4. Display matrix 10 can be addressable and can be programmed to open a suitable pattern of rollouts 16 to provide an image of the word "STOP" outlined in the retroreflective material behind the shutters. Alternatively, the letter outlines may be defined by a corresponding pattern of retroreflective material. In this case display matrix 10 need not be addressable: all the rollouts in the display can open simultaneously to display the word "STOP". Preferably also, a red background is provided around the retroreflective lettering.

The effect of stop sign 60, especially at night or during inclement weather, is, most preferably, dramatically enhanced, by providing a flashing capability. The flashing capability operates to cyclically open and close rollouts 16, for example with a frequency of about one hertz, as described hereinabove. The ON/OFF phasing may be selected for visual effect and is preferably more than 1:1, for example about 2:1, i.e. the word "STOP" is displayed for about two thirds of one second and concealed for one third. If desired, and where suitable power is available, the flashing capability may be provided by programming or otherwise controlling display matrix 10 to open and close continuously.

Alternatively, stop sign 6 may be provided with a suitable sensor, such as a cadmium sulfide photocell 62, or an induction loop 64, or both, to detect the presence of an approaching vehicle. An electronic trigger can then initiate flashing in response to a vehicle approach signal.

Whether constant, or vehicle-sensed, the flashing character of stop sign 60 will greatly reduce the probability of the sign being overlooked by an inattentive driver. If widely deployed, especially at accident-prone intersections, flashing stop signs 60 should significantly reduce the number of accidents attributable to such inattentive drivers.

The combination of reliance upon retroreflection from a vehicle's headlights to illuminate the sign in low ambient light conditions and the use of an electropolymeric structures to gate the reflected light, pursuant to the invention results in very low power requirements for stop sign 60. In city and suburban areas stop sign 60 these requirements may be satisfied by connection with the local utility's power supply. Alternatively, stop sign 60 may be self powered, employing, for example, an array 66 of solar cells and a rechargeable nickel cadmium battery (not shown).

Stop sign 60 may be supplied as a new or replacement sign or alternatively display matrix 10, as shown in FIG. 4, may be supplied as a retrofittable active panel with mounting hardware to be overlaid on or inserted into a cutout in existing stop signs. The battery, if employed, and control circuitry can be mounted out of sight behind display matrix 10.

It will be understood that signs according to the invention have a unique interactive capability being able to respond to the approach or proximity of a vehicle in a manner which is useful and informative to the driver, and which also enhances road safety. Addition of sensors capable of detecting other parameters such as vehicle height, vehicle size or vehicle type, e.g., truck, automobile motor cycle, or the like, coupled with the provision of a library of suitable messages available at or to the sign, can enable the sign to have the capacity to respond to a vehicle with a message selected to be specific to that vehicle, e.g. "LOW BRIDGE AHEAD"; "TRUCKS MUST EXIT IN 2 MILES"; "MOTOR CYCLES PROHIBITED"; and so on. A suitable message is selected according to the nature of the sensed information.

While illustrative embodiments of the invention have been described above, it is, of course, understood that various modifications will be apparent to those of ordinary skill in the art. Many such modifications are contemplated as being within the spirit and scope of the invention.

What is claimed is:

1. A traffic sign for use adjacent a vehicle travel lane, the traffic sign being illuminatable during darkness by the lights of vehicles traveling towards the traffic sign and comprising a passively illuminated pixellated display matrix, the display matrix being programmable to display desired information and having:

a) a retroreflective layer of light-reflective elements capable of reflecting light received from a traveling vehicle back towards the vehicle driver enabling the traffic sign to be viewed by the lights of the traveling vehicles; and b) an electropolymeric gating layer to gate incident light, the gating layer having an array of contiguous electrostatically actuated polymeric shutter elements defining the display pixel, the shutter elements being movable between open and closed positions in response to a drive signal wherein the polymeric shutter elements comprise:
  i) a number of prestressed coiled rollouts formed of outwardly metallized flexible polymeric material and providing electrodes movable between the open and closed positions;
  ii) a transparent dielectric layer having a viewer-facing surface contacted by the metallization of each rollout; and
  iii) a transparent fixed electrode layer contacting the opposite surface of the dielectric layer;
wherein one or more rollouts can be actuated to unroll across the dielectric layer and present a closed shutter appearance by application of a control voltage between the electrode layer and the rollout metallization;
wherein an open shutter permits incident light to be reflected from the retroreflective layer toward a viewer providing an open shutter appearance and a closed shutter presents a contrasting appearance to the viewer by daylight and by vehicle light during darkness and wherein the contrasting appearances can be composed to provide text or graphic information images.

2. A display matrix according to claim 1 wherein the retroreflective layer comprises light-reflective elements capable of reflecting light received in a non-perpendicular direction of incidence back in the direction of incidence.

3. A display matrix according to claim 2 wherein the retroreflective layer comprises transparent microspheres or prismatic sheeting.

4. A traffic sign according to claim 1 wherein the rollouts are contiguously disposed in an orthogonal array and wherein the rollouts are selectively operable whereby a desired pattern of rollouts can be opened to display a desired image of the retroreflective layer, other rollouts in the layer remaining closed to provide a contrasting background.

5. A traffic sign according to claim 4 wherein the display matrix is computerized and programmable to selectively display desired images.

6. A traffic sign according to claim 5 wherein the display matrix is programmable to display a flashing image.

7. A traffic sign according to claim 6 flashing on and off about once per second.

8. A traffic sign according to claim 6 wherein the light-reflective elements comprise transparent microspheres, glass or plastic beads or glass or plastic prisms.

9. A traffic sign according to claim 1 wherein the display matrix is programmable to display a flashing image and capable of flashing on and off about once per second, to enhance the brightness of the image.

10. A traffic sign according to claim 1 comprising a vehicle sensor to sense approach of a vehicle toward the traffic sign and a flashing capability, the flashing capability being triggered by the vehicle sensor.

11. A traffic sign according to claim 10 being self-powered and comprising an array of power generating solar cells and a rechargeable battery coupled with the solar cells to be recharged by the solar cells.

12. A stop sign comprising a traffic sign according to claim 10.

13. A traffic sign according to claim 1 without an energy-consuming light source.

14. A traffic sign according to claim 1 viewable in daylight or at night by illumination from in front of the sign.

15. A traffic sign according to claim 1 wherein the pixellated display matrix comprises a video display.

16. A traffic sign according to claim 1 wherein the display matrix is a computerized and programmable video display capable of selectively displaying desired images and is programmable to display a flashing image, wherein the light-reflective elements comprise transparent microspheres, glass or plastic beads or glass or plastic prisms and wherein the traffic sign lacks an energy-consuming light source and is viewable in daylight or at night by illumination from in front of the sign.

* * * * *

UNITED STATES PATENT AND TRADEMARK OFFICE
CERTIFICATE OF CORRECTION

PATENT NO. : 6,897,786 B1
DATED : May 24, 2005
INVENTOR(S) : Charles G. Kalt and Mark S. Slater It is certified that error appears in the above-identified patent and that said Letters Patent is hereby corrected as shown below:

Title page,
Item [22], PCT Filed, should read -- Jun. 13, 2000 --.
Item [74], *Attorney, Agent, or Firm,* should read -- Kirkpatrick & Lockhart Nicholson Graham LLP; Anthony H. Handal --.

Signed and Sealed this

Twentieth Day of September, 2005

JON W. DUDAS
*Director of the United States Patent and Trademark Office*